US011133769B2

(12) United States Patent
Fukuhara et al.

(10) Patent No.: US 11,133,769 B2
(45) Date of Patent: Sep. 28, 2021

(54) MOTOR CONTROL DEVICE

(71) Applicant: OMRON Corporation, Kyoto (JP)

(72) Inventors: Hitoshi Fukuhara, Ritto (JP); Satoshi Miyagawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,611

(22) PCT Filed: Feb. 20, 2019

(86) PCT No.: PCT/JP2019/006356
§ 371 (c)(1),
(2) Date: Mar. 2, 2020

(87) PCT Pub. No.: WO2019/187815
PCT Pub. Date: Oct. 3, 2019

(65) Prior Publication Data
US 2020/0212835 A1 Jul. 2, 2020

(30) Foreign Application Priority Data
Mar. 29, 2018 (JP) .............................. JP2018-063668

(51) Int. Cl.
H02H 7/08 (2006.01)
H02P 29/024 (2016.01)
(Continued)

(52) U.S. Cl.
CPC ............. *H02P 29/024* (2013.01); *H02P 6/28* (2016.02); *H02P 21/06* (2013.01); *H02P 29/40* (2016.02)

(58) Field of Classification Search
CPC .......... H02P 29/024; H02P 29/40; H02P 6/28; H02P 7/06
See application file for complete search history.

(56) References Cited

U.S. PATENT DOCUMENTS

2016/0134202 A1* 5/2016 Lu ........................... H02J 3/381
363/123

FOREIGN PATENT DOCUMENTS

JP S53-021722 A 2/1978
JP S59-080175 A 5/1984
(Continued)

OTHER PUBLICATIONS

English translation of the International Search Report("ISR") of PCT/JP2019/006356 dated May 28, 2019.
(Continued)

*Primary Examiner* — Karen Masih
(74) *Attorney, Agent, or Firm* — Metrolex IP Law Group, PLLC

(57) ABSTRACT

Provided is a motor control device that can detect an abnormality of a motor at an early stage. A motor control device includes: a control unit that calculates a voltage command value based on an input current command value and controls drive of the motor by using the calculated voltage command value; a virtual motor unit that simulates the value of a current flowing through the motor, based on the voltage command value calculated by the control unit and a plurality of parameters related to specifications of the motor; and a determination unit that determines whether or not the motor is in an abnormal state by comparing the current command value input to the control unit and the current value simulated by the virtual motor unit.

4 Claims, 7 Drawing Sheets

(51) Int. Cl.
*H02P 6/28* (2016.01)
*H02P 29/40* (2016.01)
*H02P 21/06* (2016.01)

(56) References Cited

FOREIGN PATENT DOCUMENTS

| | | |
|---|---|---|
| JP | H05-022977 A | 1/1993 |
| JP | H06-269191 A | 9/1994 |
| JP | 2013-240264 A | 11/2013 |
| WO | 2016/143481 A1 | 9/2016 |

OTHER PUBLICATIONS

English translation of the Written Opinion("WO") of PCT/JP2019/006356 dated May 28, 2019.

* cited by examiner

MOTOR CONTROL DEVICE

TECHNICAL FIELD

The present invention relates to a motor control device.

BACKGROUND ART

Runaway of the motor may pose a danger to workers and damage to an equipment driven by the motor. For this reason, whether or not the motor is in a runaway state is determined by comparing a rotation speed of the motor or a drive current of the motor with a threshold (see Patent Document 1, for example).

However, early detection of runaway of the motor has not been achieved in some cases by comparing the motor rotation speed and the like with the threshold.

CITATION LIST

Patent Document

[Patent document 1] Japanese Patent Laid-Open No. H5-22977

SUMMARY OF THE INVENTION

Technical Problem

An object of the present invention, which was made in view of the above situation, is to provide a motor control device that can detect an abnormality of a motor at an early stage.

Solution to Problem

To achieve the object, a motor control device that controls a motor, according to one aspect of the present invention includes: a control unit that calculates a voltage command value based on an input current command value and controls drive of the motor by using the calculated voltage command value; a virtual motor unit that simulates the value of a current flowing through the motor, based on the voltage command value calculated by the control unit and a plurality of parameters related to specifications of the motor; and a determination unit that determines whether or not the motor is in an abnormal state by comparing the current command value input to the control unit and the current value simulated by the virtual motor unit.

In other words, the motor control device according to one aspect of the present invention has a configuration that determines whether or not the motor is in an abnormal state by comparing a current command value input to the control unit with the current value simulated based on the voltage command value calculated by a virtual motor unit from the current command value. In other words, the motor control device has a configuration that the reference value (current command value or simulated current value) for determining whether or not the motor is in an abnormal state is changed according to situations. Accordingly, the motor control device can detect an abnormality of the motor at an earlier stage than ever before.

Various components having different specific configurations can be employed as the units (control unit, virtual motor unit, and determination unit) of the motor control device. For example, the determination unit may be a unit that compares the difference between a current command value and a current value with a threshold in order to determine whether or not the motor is in an abnormal state, or a unit that compares the ratio of the current command value to the current value with a threshold (upper/lower threshold).

The motor control device may employ a configuration in which a d-axis current command value and a q-axis current command value as the current command value are input to the control unit, and the control unit calculates a d-axis voltage command value and a q-axis voltage command value as the voltage command value, based on the input d-axis current command value and q-axis current command value. In other words, the control unit of the motor control device may perform vector control.

When a control unit that performs vector control is employed, the plurality of parameters may include a parameter indicating a resistance of an armature of each phase of the motor, a parameter indicating a d-axis inductance of the motor, a parameter indicating a q-axis inductance of the motor, and a parameter indicating an armature linkage flux of a permanent magnet in the motor. Further, at least one of the plurality of parameters may be information indicating temperature dependency of a physical property of the motor, and the virtual motor unit may be the one that simulates a d-axis current value and a q-axis current value of the motor, based on the d-axis voltage command value, the q-axis voltage command value, the plurality of parameters, and a temperature of the motor.

Advantageous Effects of the Invention

The present invention can provide a motor control device that can detect an abnormality of a motor at an early stage.

DESCRIPTION OF EMBODIMENTS

An embodiment of the present invention will be described below with reference to the accompanying drawings.

First Embodiment

Figure 1:
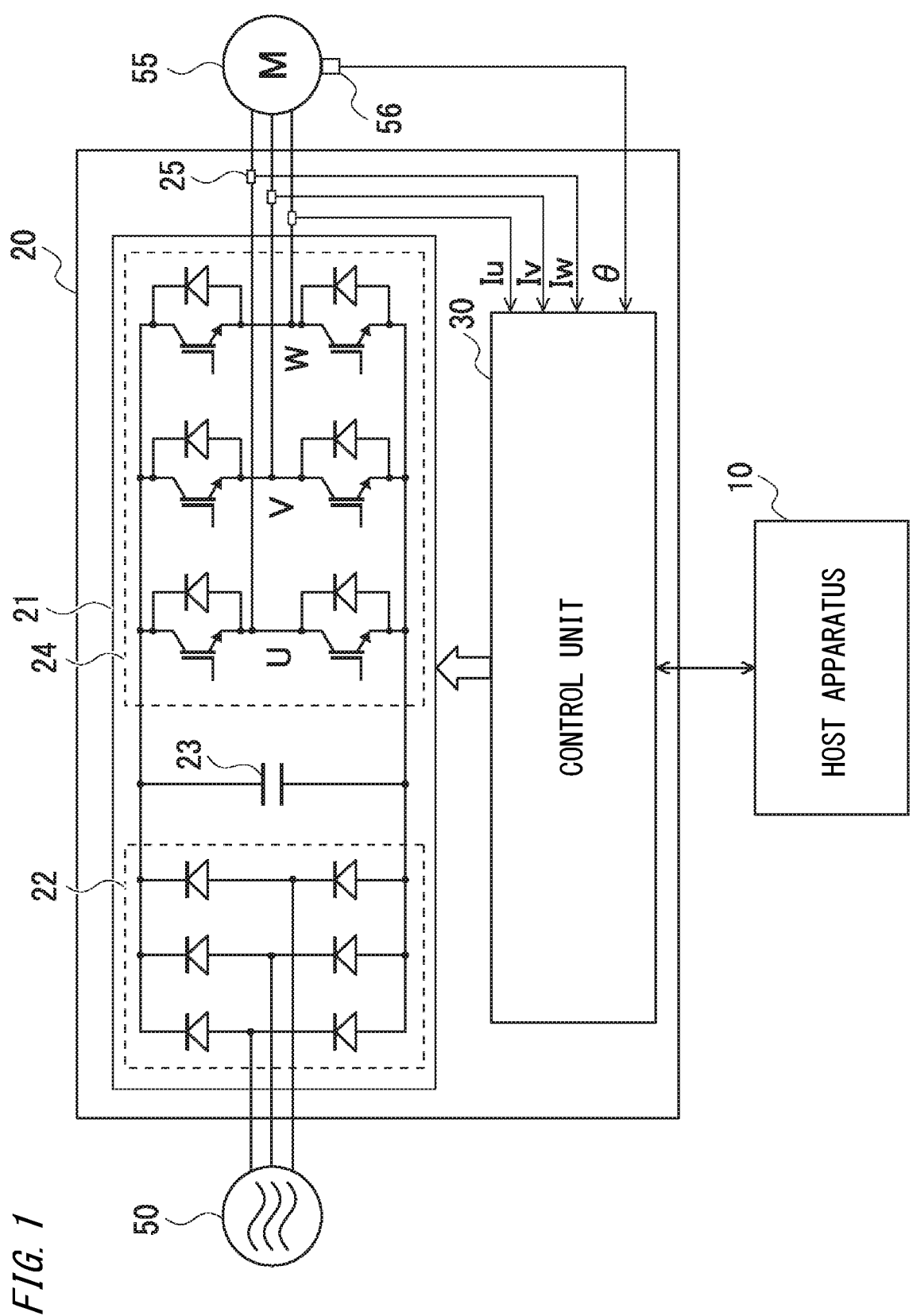
FIG. 1 is an explanatory diagram of the schematic configuration and mode of use of a motor control device according to a first embodiment of the present invention.

FIG. 1 illustrates the schematic configuration and mode of use of a motor control device 20 according to a first embodiment of the present invention.

The motor control device 20 according to this embodiment is an apparatus (so-called servo driver) for driving a motor (three-phase motor) 55. As illustrated in the drawing, the motor control device 20 includes a power circuit 21 and a control unit 30.

The power circuit 21 is a circuit that generates a three-phase alternating current to be supplied to the motor 55 under the control by the control unit 30 (which will be described in detail later). The power circuit 21 includes a rectifier circuit 22 for rectifying three-phase alternating current from a three-phase power supply 50 and a smoothing capacitor 23. The power circuit 21 also includes an inverter circuit 24 for converting the output voltage of the rectifier circuit 22 smoothed by the smoothing capacitor 23, into a three-phase AC voltage.

The control unit 30 is basically a unit that controls the motor 55 by controlling the inverter circuit 24 according to an instruction from the host apparatus 10, such as a programmable logic controller (PLC). The control unit 30 consists of a processor (for example, CPU or microcontroller) and its peripheral circuits.

As illustrated in the drawing, the motor control device 20 is provided with three current sensors 25 for measuring the U-phase current value Iu, the V-phase current value Iv, and the W-phase current value Iw of the motor 55. The motor 55 is provided with a rotation angle sensor 56 for detecting the rotation angle θ of the motor 55, and information from these sensors 25 and 56 is input to the control unit 30.

Figure 2:
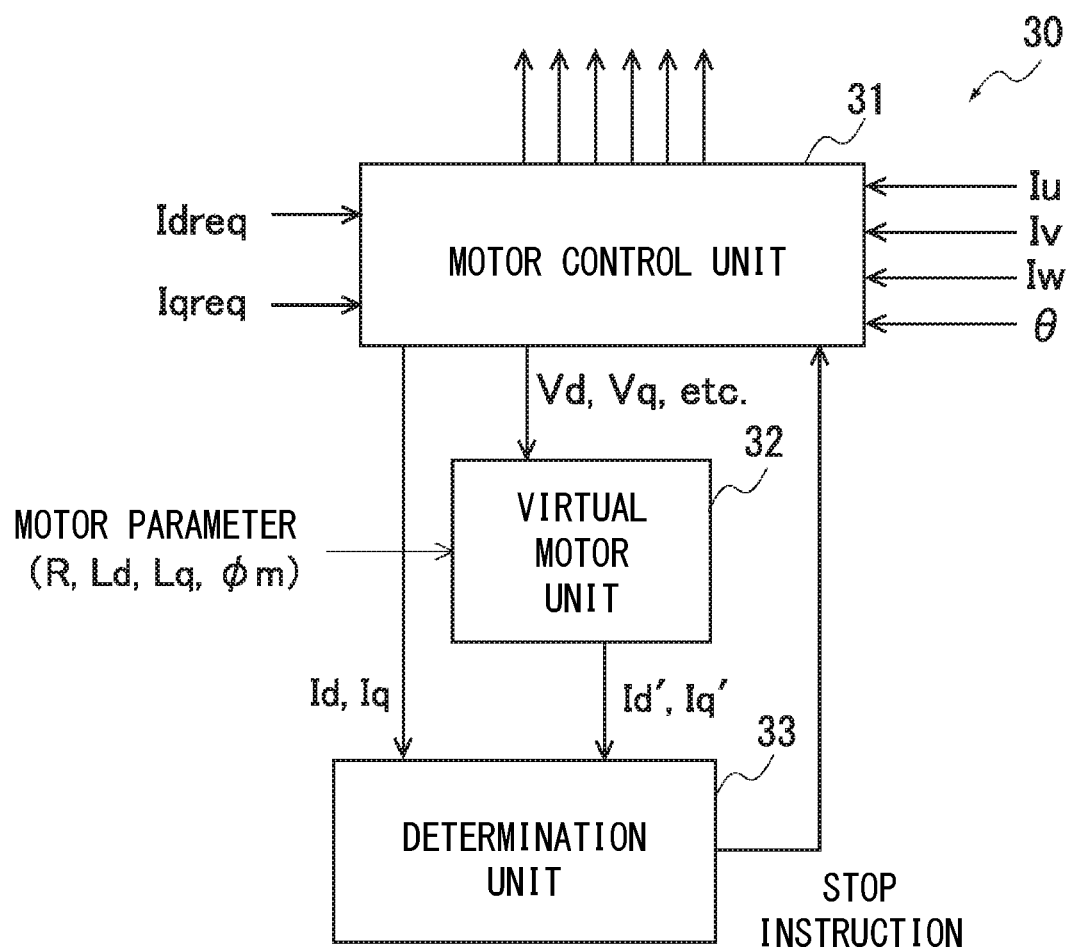
FIG. 2 is a functional block diagram of a control unit included in the motor control device according to the first embodiment.
Figure 3:
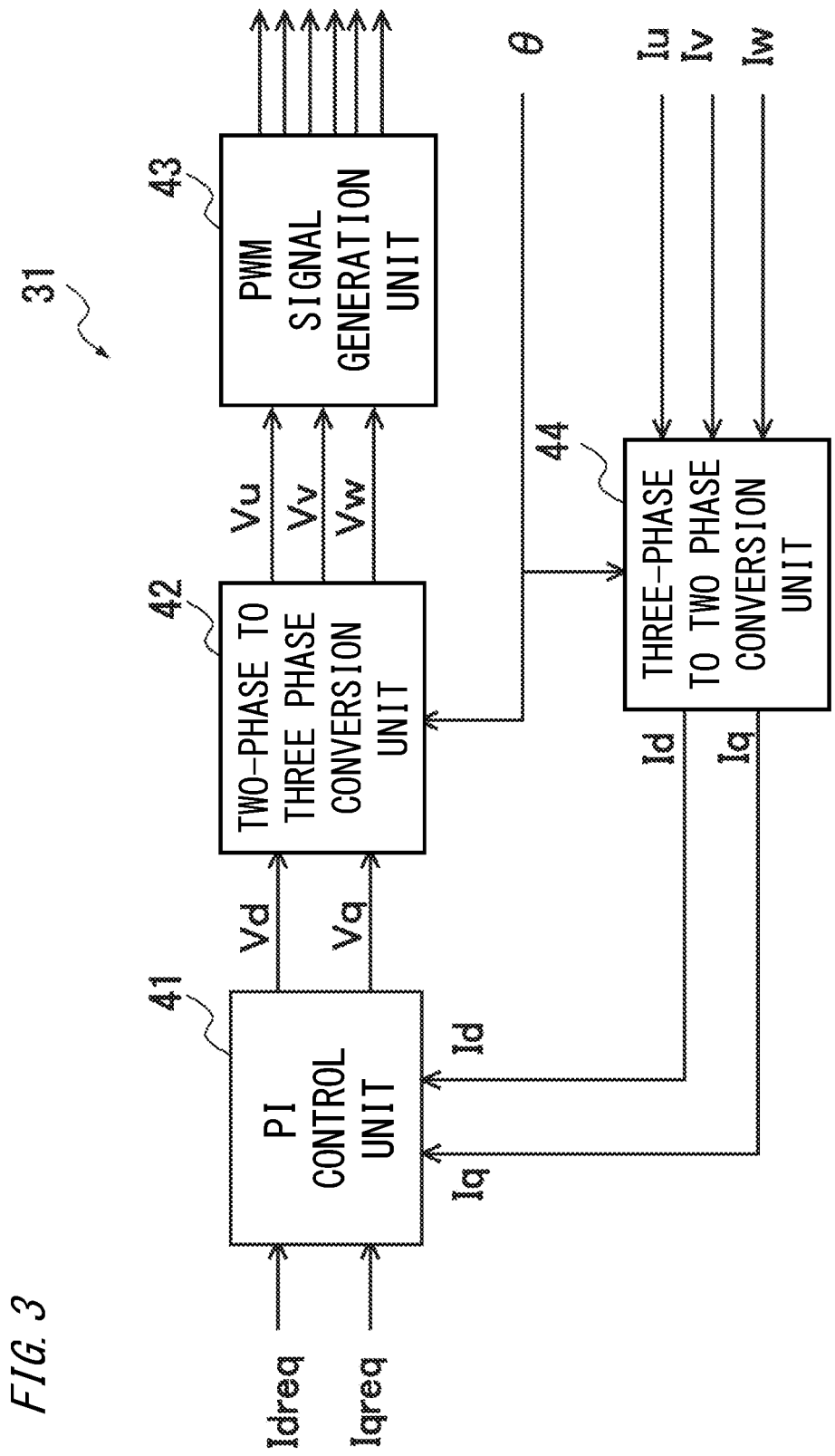
FIG. 3 is a functional block diagram of a motor control unit.
Figure 4:
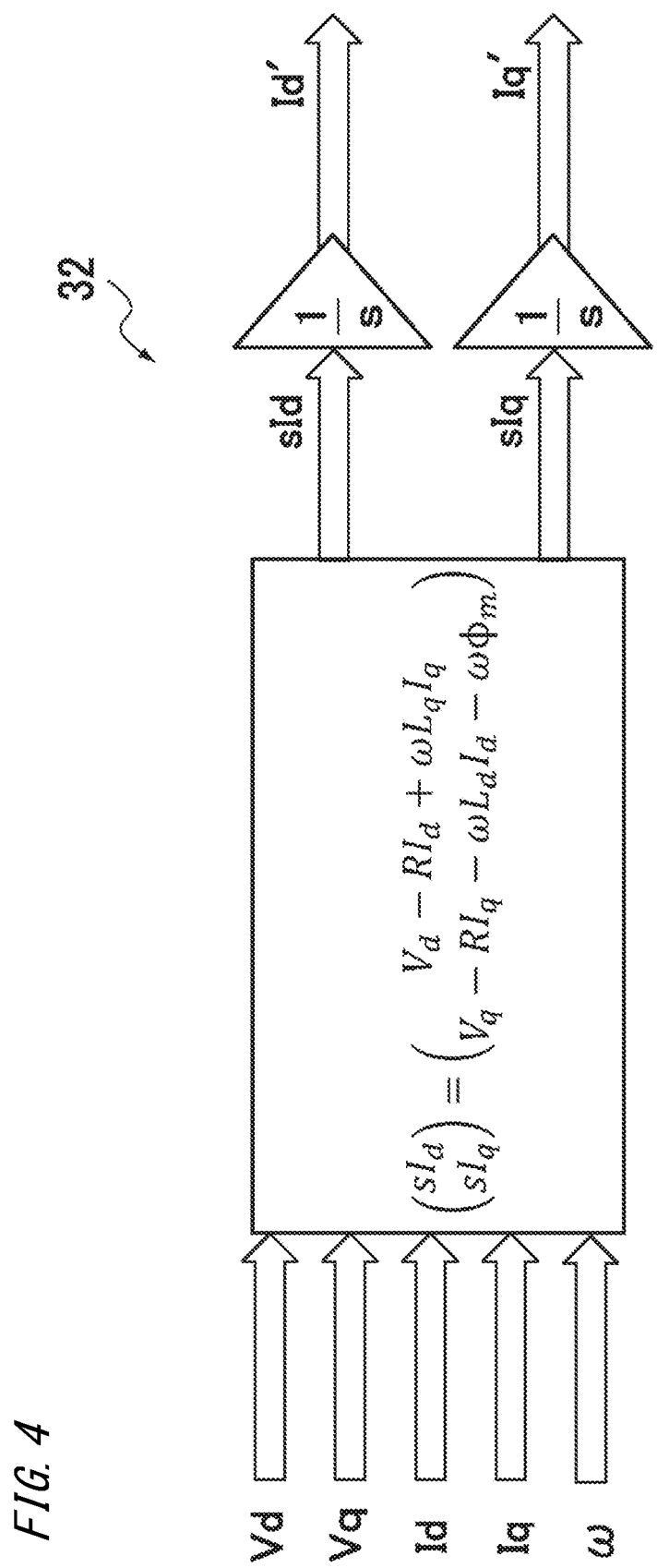
FIG. 4 is a functional block diagram of a virtual motor unit.
Figure 5:
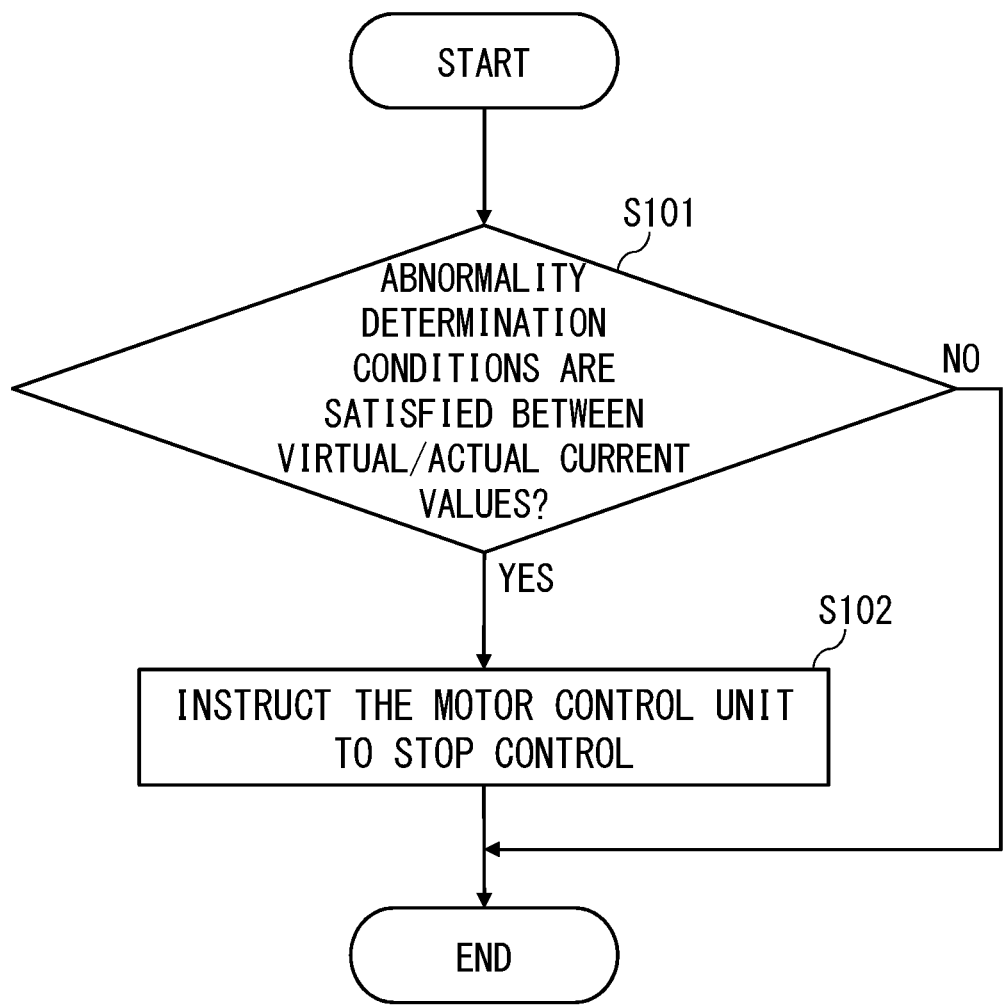
FIG. 5 is a flowchart of a determination process performed by a determination unit.

The function of the control unit 30 will be described below with reference to FIGS. 2 to 5. FIG. 2 is a functional block diagram of the control unit 30, and FIG. 3 is a functional block diagram of the motor control unit 31. FIG. 4 is a functional block diagram of the virtual motor unit 32, and FIG. 5 is a flowchart of a determination process performed by the determination unit 33. Note that each of the functional blocks illustrated in FIGS. 2 to 4 may use a software (may be implemented as a function of a processor) or may be a hardware (such as an integrated circuit).

As illustrated in FIG. 2, the control unit 30 of the motor control device 20 functions as a motor control unit 31, a virtual motor unit 32, and a determination unit 33.

The motor control unit 31 is a functional block that controls the motor 55 by vector control based on the current command values Idreq and Iqreq, U-phase current value Iu, V-phase current value Iv, W-phase current value Iw, and rotation angle θ of the motor 55. The virtual motor unit 32 and the determination unit 33 are functional blocks mounted on the control unit 30 so that an abnormality of the motor 55 can be detected at an early stage.

The functions of the motor control unit 31, the virtual motor unit 32, and the determination unit 33 will now be described in detail.

[Motor Control Unit 31]

As illustrated in FIG. 3, the motor control unit 31 includes a PI control unit 41, a two-phase to three-phase conversion unit 42, a PWM signal generation unit 43, and a three-phase to two-phase conversion unit 44.

The PI control unit 41 is a functional block that generates a voltage command value Vd by PI calculation of a current deviation between the current command value Idreq and the current value Id from the three-phase to two-phase conversion unit 44, and generates the voltage command value Vq by PI calculation of a current deviation between the current command value Iqreq and the current value Iq from the three-phase to two-phase conversion unit 44. Note that the current command values Idreq and Iqreq in this embodiment are information generated in the control unit 30 based on a command (for example, speed command or position command) from the host apparatus 10 and other information (for example, the speed of the motor 55). However, the current command values Idreq and Iqreq may be information input from the host apparatus 10.

The two-phase to three-phase conversion unit 42 is a functional block that converts the voltage command values Vd and Vq from the PI control unit 41 into three-phase AC voltage command values Vu, Vv, and Vw, using the rotation angle θ of the motor 55. The PWM signal generation unit 43 is a functional block that generates a PWM signal for ON/OFF control of six semiconductor switches in the inverter circuit 24 based on the voltage command values Vu, Vv, and Vw from the two-phase to three-phase conversion unit 42.

The three-phase to two-phase conversion unit 44 is a functional block that converts the current values Iu, Iv, and Iw of each phase detected by the current sensor 25 for each phase into two-phase current values Id and Iq in a rotation coordinate system based on the rotation angle θ of the motor 55.

The motor control unit 31 is a functional block that performs vector control with the above-described configuration and, upon reception of a predetermined stop instruction from the determination unit 33, stops controlling the motor 55 (inverter circuit 24) (see FIG. 2).

[Virtual Motor Unit 32]

The virtual motor unit 32 (FIG. 2) is a functional block that simulates the current command values Idreq and Iqreq based on the voltage command values Vd and Vq and the like calculated by the motor control unit 31 and various preset motor parameters.

Before starting the actual operation of the motor control device 20, the host apparatus 10 or another computer sets the following motor parameters in the virtual motor unit 32.

The resistance R[ohm] of the armature of each phase of the motor 55

The d-axis inductance Ld[H] and the q-axis inductance Lq[H] of the motor 55

The armature linkage flux φm [V/(rad/sec)] of the permanent magnet in the motor 55

During operation of the motor control device 20, the virtual motor unit 32 receives the voltage command values Vd and Vq and the current values Id and Iq generated during the control processing of the motor 55 by the motor control unit 31 (FIG. 3) and the electrical angular velocity ω (a value obtained by differentiating the electrical angle θe calculated from θ) of the motor 55.

As schematically illustrated in FIG. 4, the virtual motor unit 32 is configured that repeats a process of calculating sId and sIq by the following equation (1) and integrating the calculated sId and sIq to obtain the simulation results Id' and Iq' of Id and Iq.

$$\begin{pmatrix} sI_d \\ sI_q \end{pmatrix} = \begin{pmatrix} V_d - RI_d + \omega L_q I_q \\ V_q - RI_q - \omega L_d I_d - \omega \phi_m \end{pmatrix} \quad (1)$$

Note that s in Equation (1) is a Laplace operator. Equation (1) is an equation solving the following equation (2), which is a voltage equation in the dq coordinate system of the permanent magnet synchronous motor, in terms of sId and sIq.

$$\begin{pmatrix} V_d \\ V_q \end{pmatrix} = \begin{pmatrix} R + sL_d & -\omega L_q \\ \omega L_d & R + sL_q \end{pmatrix} \begin{pmatrix} I_d \\ I_q \end{pmatrix} + \begin{pmatrix} 0 \\ \omega \phi_m \end{pmatrix} \quad (2)$$

[Determination Unit 33]

The determination unit 33 is a functional block that performs the determination process in the procedure illustrated in FIG. 5 every time the virtual motor unit 32 calculates the simulation results Id' and Iq' of Id and Iq.

In other words, when the simulation results Id' and Iq' of Id and Iq are calculated by the virtual motor unit 32, the determination unit 33 determines whether or not abnormality determination conditions are satisfied between the virtual current value and the actual current value (Step S101).

Here, the virtual current value is one or both of the simulation results Id' and Iq'. When the virtual current value is Id' and Iq', the actual current value refers to the current command values Idreq and Iqreq, or the current values Id and Iq. When the virtual current value is Ix' (x=d, q), the actual current value refers to the current command value Ixreq or the current value Ix.

The abnormality determination conditions are conditions (a relational expression between an actual current value and a virtual current value) that is predetermined so that it can be satisfied when the motor 55 can be determined to be in an abnormal state.

In other words, the virtual current value (Id' and/or Iq') is a theoretical value of two-phase current value flowing through the motor 55 when the motor 55 is in a normal state. Accordingly, whether or not the motor 55 is in an abnormal state can be determined by a quantity of the difference between the virtual current value and the actual current value.

To be specific, when Id' and Iq' are used as virtual current values and Id and Iq are used as actual current values, for example, use of the following conditions as abnormality determination conditions makes it possible to determine whether or not the motor 55 is in an abnormal state.

$(Id'-Id)^2+(Iq'-Iq)^2 \geq$ threshold (Id'/Id) value is out of an allowable range for Id, and (Iq'/Iq) value is out of an allowable range for Iq.

When Ix' (x=d, q) is used as a virtual current value and Ix is used as an actual current value, for example, use of the following conditions as abnormality determination conditions makes it possible to determine whether or not the motor 55 is in an abnormal state.

$|Ix'-Ix|$ threshold (Ix'/Ix) value is out of an allowable range

Note that each of the thresholds and each of the allowable ranges under the various conditions described above may be predetermined through experiments, for example.

If the abnormality determination conditions are not satisfied (Step S101; NO), the determination unit 33 ends this determination process (the process in FIG. 5) without performing any process. In contrast, if the abnormality determination conditions are satisfied (Step S101; YES), the determination unit 33 instructs the motor control unit 31 to stop the control (Step S102), and ends this determination process.

As described above, the motor control device 20 according to this embodiment has a configuration that determines whether or not the motor 55 is in an abnormal state by comparing a current command value input to the motor control unit 31 with the current flowing though the motor 55 simulated based on the voltage command value calculated by the motor control unit 31 from the current command value. In other words, the motor control device has a configuration that the reference value (current command value or simulated current value) for determining whether or not the motor 55 is in an abnormal state is changed according to situations. Hence, with the motor control device, an abnormality of the motor can be detected at an earlier stage than ever before.

Second Embodiment

Figure 6:
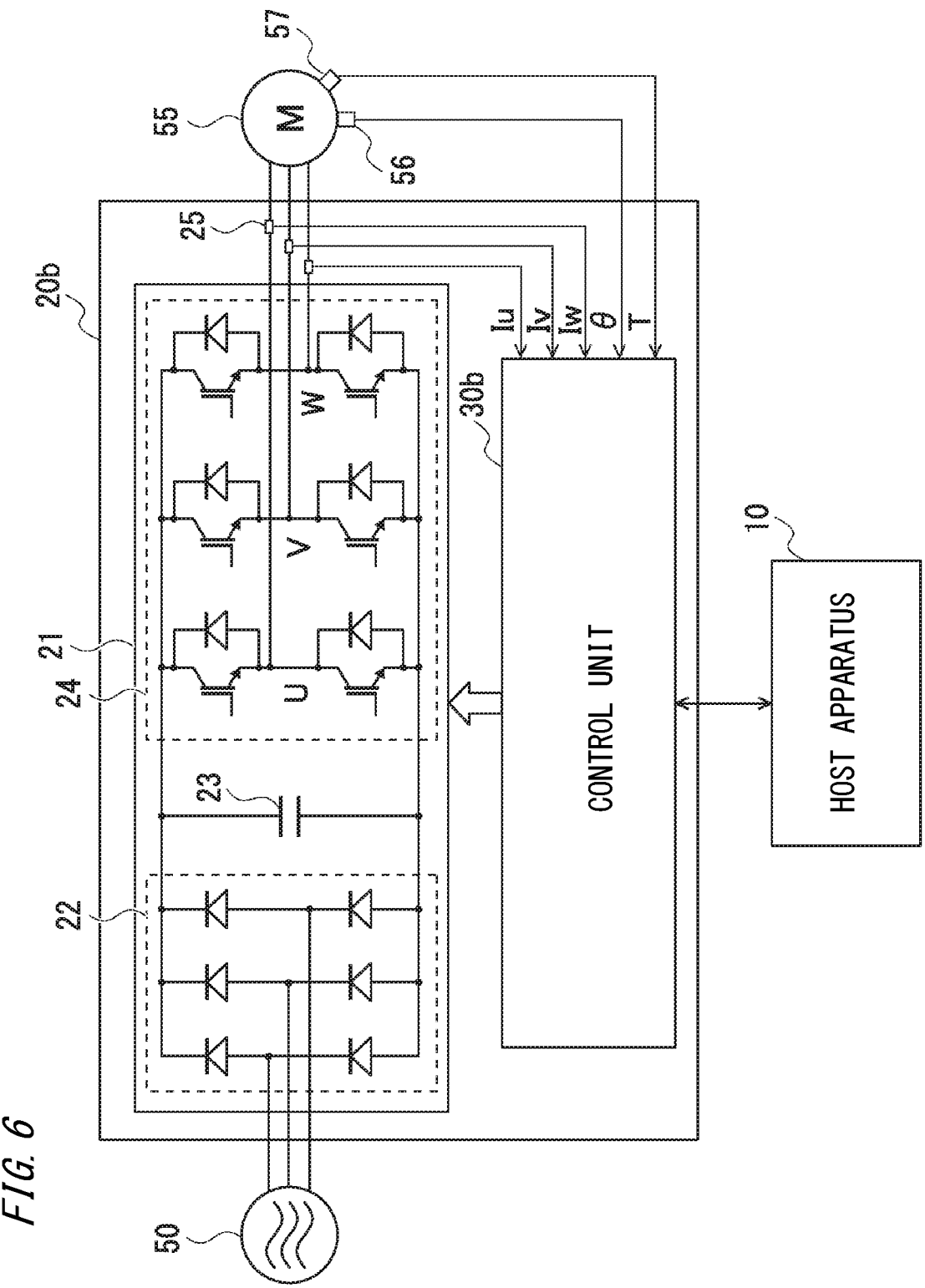
FIG. 6 is an explanatory diagram of a schematic configuration and mode of use of a motor control device according to a second embodiment of the present invention.

FIG. 6 illustrates the schematic configuration and mode of use of a motor control device 20b according to a second embodiment of the present invention.

The motor control device 20b according to this embodiment is an apparatus in which the control unit 30 of the motor control device 20 is replaced with a control unit 30b. The control unit 30b is a unit modified from the control unit 30 so that whether or not the motor 55 is in an abnormal state is determined considering the temperature of the motor 55.

Figure 7:
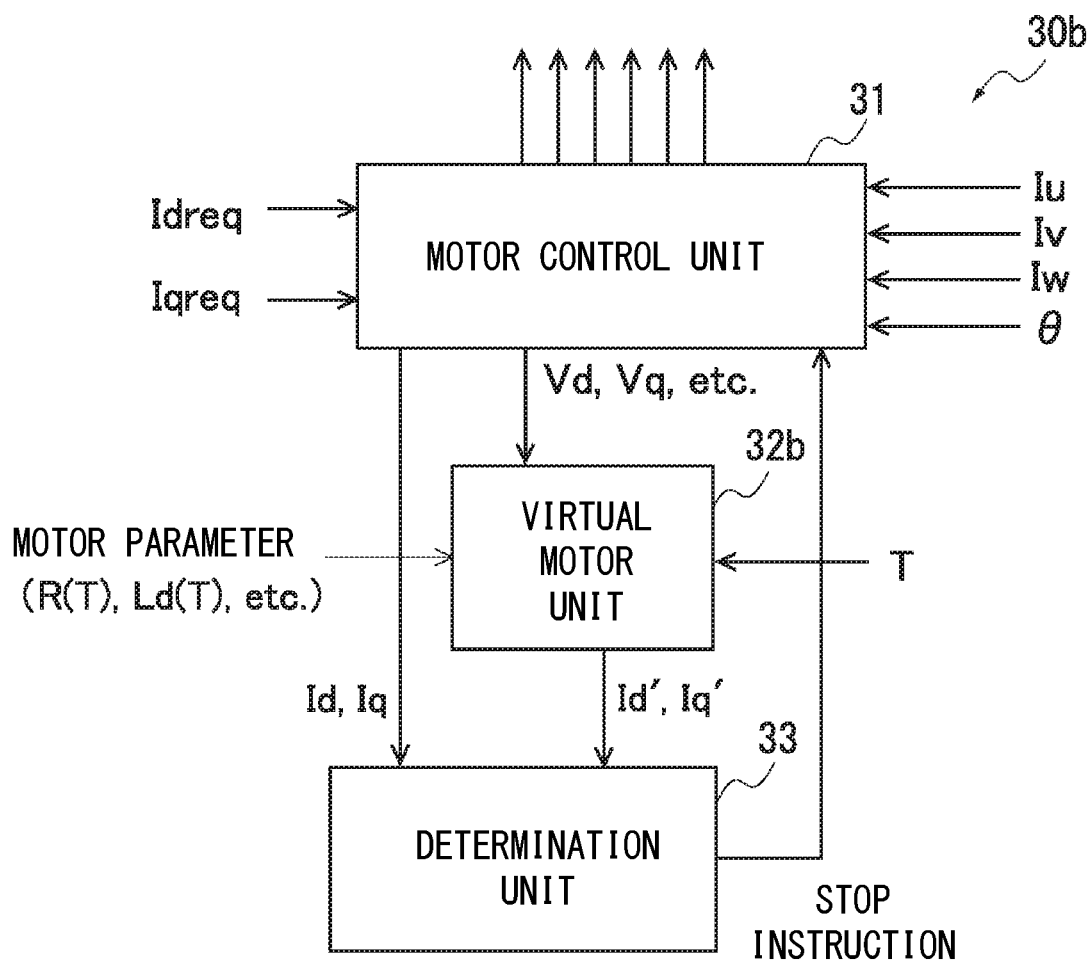
FIG. 7 is a functional block diagram of a control unit included in the motor control device according to the second embodiment.

To be specific, as illustrated in FIG. 7, the control unit 30b has a configuration in which the virtual motor unit 32 of the control unit 30 is replaced with a virtual motor unit 32b.

Like the virtual motor unit 32, the virtual motor unit 32b is a functional block that simulates the current command values Idreq and Iqreq based on the voltage command values Vd and Vq and the like calculated by the motor control unit 31 and various preset motor parameters.

However, the virtual motor unit 32b includes, as various motor parameters, information R(T) representing the resistance of the armature of each phase of the motor 55 as a function of the temperature T of the motor 55, and information Ld(T) representing the d-axis inductance of the motor 55 as a function of the temperature T. The temperature T of the motor 55 is input to the virtual motor unit 32b from a temperature sensor 57 attached to the motor 55. The virtual motor unit 32b is configured to calculate Id' and Iq' using parameter values (for example, resistance R and d-axis inductance Ld) of the motor 55 at the current temperature T (see FIG. 4).

As described above, the motor control device 20b according to this embodiment is configured to simulate the current command value in consideration of the temperature T of the motor 55; thus, this configuration does not need to determine abnormality determination conditions in consideration of the influence of the temperature T of the motor 55. In the motor control device 20 described above, it is necessary to determine abnormality determination conditions in consideration of the influence of the temperature T of the motor 55. Therefore, the motor control device 20b in which it is not necessary to determine abnormality determination conditions in consideration of the influence of the temperature T of the motor 55 can detect an abnormality of the motor 55 at an earlier stage than the motor control device 20.

<Modification>

Various modifications can be made for the motor control devices (20 and 20b) according to the embodiments described above. For example, the control unit 30 (motor control unit 31) may be modified to one that performs sensorless vector control or one that does not perform vector control. When the abnormality determination conditions are satisfied, the determination unit 33 may be modified to the one that sends information indicating this fact to the host apparatus 10 while sending a stop instruction or not.

It is acceptable that not all the motor parameters set in the virtual motor unit 32b indicate the temperature dependency, and some motor parameters set in the virtual motor unit 32b may indicate the temperature dependency.

APPENDIX

A motor control device (20) that controls a motor (55), comprising:
  a control unit (31) that calculates a voltage command value based on an input current command value and controls drive of the motor by using the calculated voltage command value;
  a virtual motor unit (32) that simulates the value of a current flowing through the motor, based on the voltage command value calculated by the control unit (31) and a plurality of parameters related to specifications of the motor (55); and
  a determination unit (33) that determines whether or not the motor (55) is in an abnormal state by comparing the current command value input to the control unit (31) and the current value simulated by the virtual motor unit (32).

REFERENCE SIGNS LIST

10 Host apparatus
20, 20b Motor control device
21 Power circuit
22 Rectifier circuit
23 Smoothing capacitor
24 Inverter circuit
25 Current sensors
30, 30b Control unit
31 Motor control unit
32, 32b Virtual motor unit
33 Determination unit
41 PI control unit
42 Two-phase to three-phase conversion unit
43 PWM signal generation unit
44 Three-phase to two-phase conversion unit
50 Three-phase power supply
55 Motor
56 Rotation angle sensor
57 Temperature sensor

The invention claimed is:

1. A motor control device that controls a motor, comprising:
  a control unit that calculates a voltage command value based on an input current command value and drives the motor by using the calculated voltage command value;
  a virtual motor unit that simulates a value of a current flowing through the motor, based on: the voltage command value calculated by the control unit a plurality of parameters comprising information indicating a temperature dependency of a physical property of the motor and related to specifications of the motor; and a temperature of the motor; and
  a determination unit that determines whether or not the motor is in an abnormal state based on a comparison between the current command value input to the control unit and the value of the current simulated by the virtual motor unit.

2. The motor control device according to claim 1, wherein
  a d-axis current command value and a q-axis current command value as the current command value are input to the control unit, and
  the control unit calculates a d-axis voltage command value and a q-axis voltage command value as the voltage command value, based on the input d-axis current command value and q-axis current command value.

3. The motor control device according to claim 2, wherein the plurality of parameters include a parameter indicating a resistance of an armature of each phase of the motor, a parameter indicating a d-axis inductance of the motor, a parameter indicating a q-axis inductance of the motor, and a parameter indicating an armature linkage flux of a permanent magnet in the motor.

4. The motor control device according to claim 3, wherein the virtual motor unit simulates a d-axis current value and a q-axis current value of the motor, based on the d-axis voltage command value, the q-axis voltage command value, the plurality of parameters, and the temperature of the motor.

* * * * *